United States Patent [19]

Inaba et al.

[11] Patent Number: 4,924,373

[45] Date of Patent: May 8, 1990

[54] APPARATUS AND METHOD FOR CONTROLLING SWITCHING ELEMENTS IN A PWN-CONTROLLED VOLTAGE SOURCE INVERTER

[75] Inventors: Hiromi Inaba; Kiyoshi Nakamura; Akira Kimura; Sadao Hokari, all of Katsuta; Naoyuki Oouchi, Hitachi, all of Japan

[73] Assignees: Hitachi, Ltd., Tokyo; Hitachi Engineering Co., Ltd., Hitachi, both of Japan

[21] Appl. No.: 298,962

[22] Filed: Jan. 19, 1989

[30] Foreign Application Priority Data

Feb. 1, 1988 [JP] Japan .................. 63-19690

[51] Int. Cl.⁵ .............................. H02M 7/44
[52] U.S. Cl. ........................ 363/95; 363/41; 363/98
[58] Field of Search ............. 363/41, 95, 98, 132

[56] References Cited

U.S. PATENT DOCUMENTS

| 4,099,109 | 7/1978 | Abbondanti | 363/41 |
| 4,290,108 | 9/1981 | Woehrle et al. | 363/41 |
| 4,513,362 | 4/1985 | Aizawa | 363/98 |
| 4,772,996 | 9/1988 | Hanei et al. | 363/132 |
| 4,870,556 | 9/1989 | Inaba | 363/37 |

FOREIGN PATENT DOCUMENTS 49509 12/1980 Japan .
163577 7/1987 Japan .

OTHER PUBLICATIONS

Kamiyama; "New Drive Electronics", Jul. 1986, p. 92.

Primary Examiner—Patrick R. Salce
Assistant Examiner—Jeffrey Sterrett
Attorney, Agent, or Firm—Antonelli, Terry & Wands

[57] ABSTRACT

Disclosed is an apparatus and method for controlling switching elements (51-56) of a PWM-controlled value type inverter by a software program using a microcomputer (10). The control apparatus of the present invention produces a switching element control signal (an on/off signal) according to the following steps. When a control command value commanding the output of the inverter is determined, a control mode corresponding to the commanded output value is selected from among a plurality of control modes (M1-M6) previously contained in a table to determine the switching elements to which the control signal is applied and the order of controlling the switching elements. Further, on the basis of the control command value, the difference between a modulation signal and a predetermined reference value is computed for each phase to determine the timing of controlling the switching elements. The unit control period of each control mode is divided into halves, and the switching element control timing is determined in each of the halves of the unit control period. The control signal is produced on the basis of the combination of the selected control mode and the determined control timing.

16 Claims, 12 Drawing Sheets

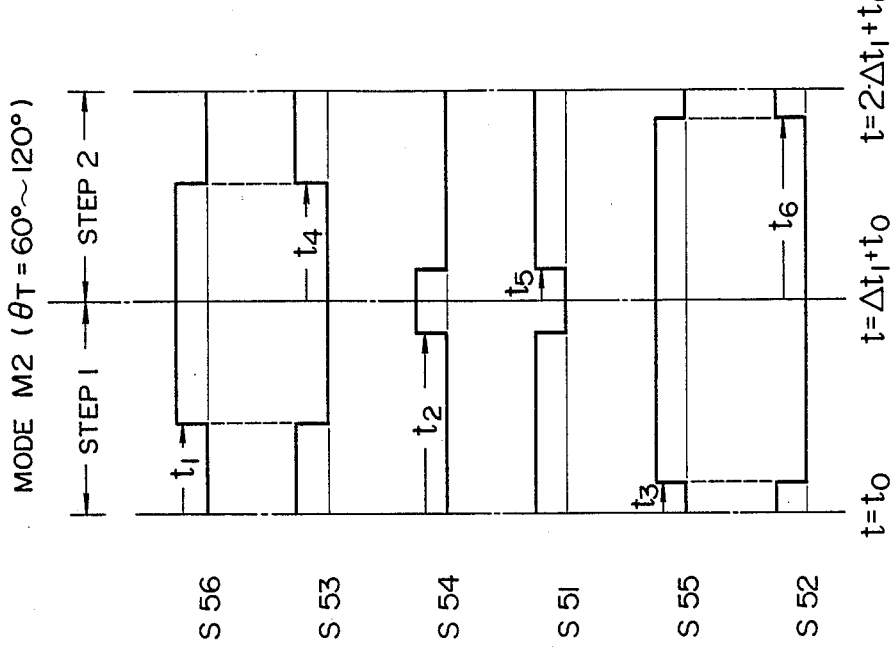
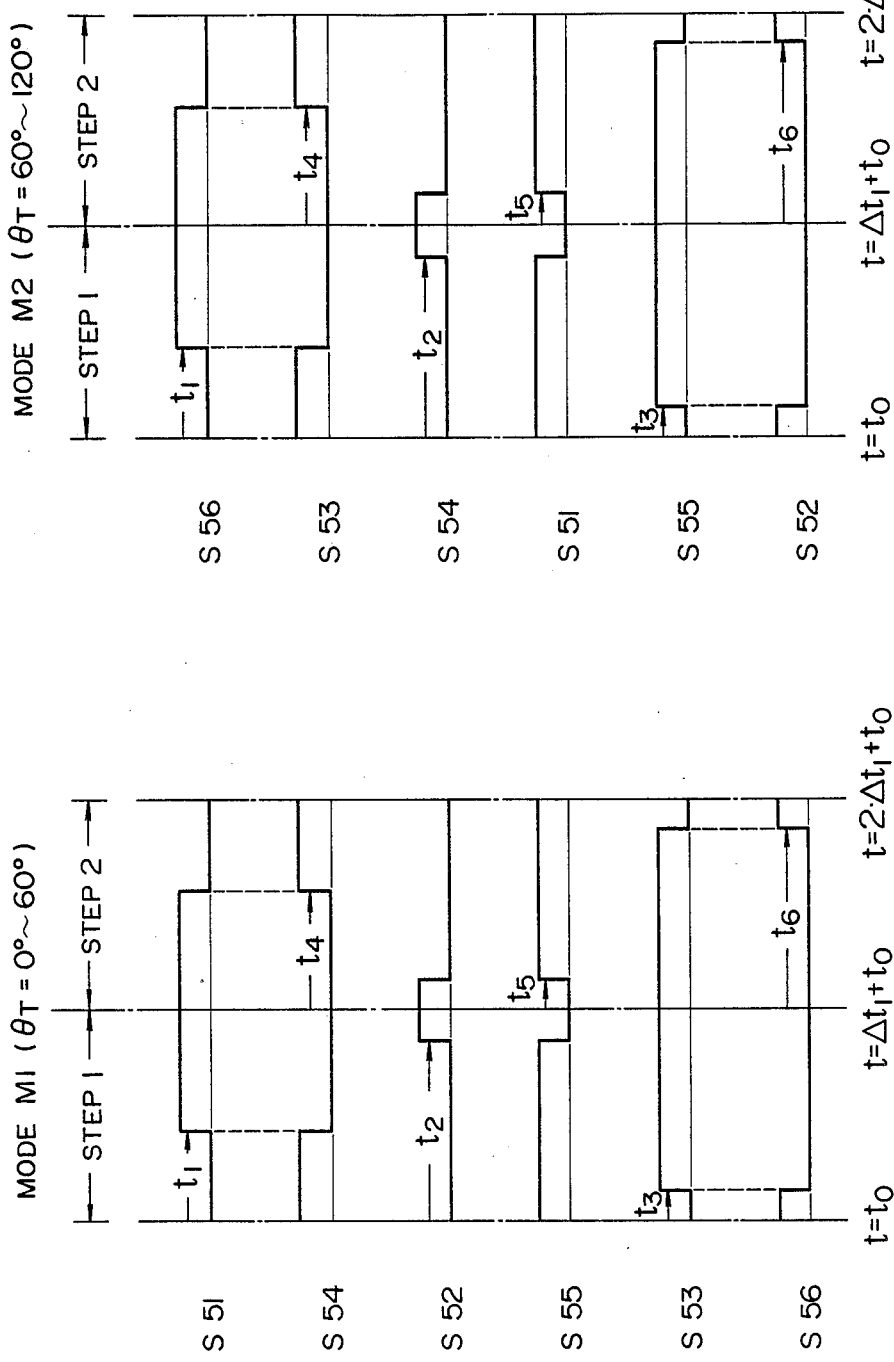

FIG. 14

| PROCESSING STEP \ MODE | M1 | M2 | M3 | M4 | M5 | M6 |
|---|---|---|---|---|---|---|
| F2002 (STEP 1) | 54,55,56 ON 51,52,53 OFF | 51,52,53 ON 54,55,56 OFF | 54,55,56 ON 51,52,53 OFF | 51,52,53 ON 54,55,56 OFF | 54,55,56 ON 51,52,53 OFF | 51,55,53 ON 54,55,56 OFF |
| F2003 | 53 ON, 56 OFF | 55 ON, 52 OFF | 51 ON, 54 OFF | 56 ON, 53 OFF | 52 ON, 55 OFF | 54 ON, 51 OFF |
| F2004 | 51 ON, 54 OFF | 56 ON, 53 OFF | 52 ON, 55 OFF | 54 ON, 51 OFF | 53 ON, 56 OFF | 55 ON, 52 OFF |
| F2005 | 52 ON, 55 OFF | 54 ON, 51 OFF | 53 ON, 56 OFF | 55 ON, 52 OFF | 51 ON, 54 OFF | 56 ON, 53 OFF |
| F2007 (STEP 2) | 51,52,53 ON 54,55,56 OFF | 54,55,56 ON 51,52,53 OFF | 51,52,53 ON 54,55,56 OFF | 54,55,56 ON 51,52,53 OFF | 51,52,53 ON 54,55,56 OFF | 54,55,56 ON 51,52,53 OFF |
| F2008 | 55 ON, 52 OFF | 51 ON, 54 OFF | 56 ON, 53 OFF | 52 ON, 55 OFF | 54 ON, 51 OFF | 53 ON, 56 OFF |
| F2009 | 54 ON, 51 OFF | 53 ON, 56 OFF | 55 ON, 52 OFF | 51 ON, 54 OFF | 56 ON, 53 OFF | 52 ON, 55 OFF |
| F2010 | 56 ON, 53 OFF | 52 ON, 55 OFF | 54 ON, 51 OFF | 53 ON, 56 OFF | 55 ON, 52 OFF | 51 ON, 54 OFF |

APPARATUS AND METHOD FOR CONTROLLING SWITCHING ELEMENTS IN A PWN-CONTROLLED VOLTAGE SOURCE INVERTER

BACKGROUND OF THE INVENTION

This invention relates to a control system for controlling a PWM-controlled voltage source inverter, and more particularly to an apparatus and method suitable for the PWM control of a voltage source inverter according to a software program using a microcomputer.

As prior art apparatus designated for the PWM control of voltage source inverters, both of those based on a method using an analog circuit and those based on a method using a digital circuit are already known.

A prior art PWM control apparatus based on the former method is disclosed in, for example, a book entitled "New Drive Electronics" written by Naohiko Kaniyama and published by Denki Shoin Publishing Co. in Japan in July, 1986. According to the method described in page 92 of this publication, a voltage command signal (a modulation wave signal) representing the error between a current command signal and an output current of a voltage source inverter is compared in an analog circuit with a given triangular wave signal which is a carrier wave signal, so as to generate a desired pulse pattern used for controlling the PWM-controlled voltage source inverter. In a modification of the former method, the modulation wave signal and the carrier wave signal are compared in a digital fashion. Herein, such a modification is classified to belong to the former method.

A prior art PWM control apparatus for controlling a voltage source inverter according to the latter method using a digital circuit is disclosed in, for example, Japanese Patent Publication No. 55-49509 filed as a patent application by Mitsubishi Electric Co., Ltd. in Japan on December 28, 1973 and published on December 12, 1980. The cited publication proposes a method which attempts to generate an improved rectangular output from the voltage source inverter by alternately applying on-off control to two phases and generally increasing and decreasing the pulse width of the rectangular wave output.

On the other hand, a method for controlling a current source inverter instead of a voltage source inverter is disclosed in JP-A-62-163577 filed as a patent application by Hitachi, Ltd. on January 11, 1986 and laid open on July 20, 1987. The disclosure of the cited publication proposes to generate a sine wave output from a PWM-controlled current source inverter by converting instantaneous values of a sine wave into corresponding pulse widths. Further, U.S. Pat. No. 4,870,556 and whose assigners include some of the inventors of the present application, discloses a method for controlling a current source inverter by a microcomputer.

In the related art described above, any consideration is not especially given to application of the PWM control apparatus for the control of the voltage source inverter according to a software program, and various problems such as a capability of generation of an output waveform sufficiently close to a sinusoidal waveform and a capability of reduction of the size of the PWM control apparatus remain still to be solved.

More specifically, in the case of the PWM control apparatus based on the method using the analog circuit, a plurality of comparators each including an operational amplifier are essentially required, and this requirement leads to problems such as a lot of time and labor consumed for adjustment of the comparators and an inevitable increase in the circuit scale. Also, in the case of the PWM control apparatus based on the method using the digital circuit, generation of an ideal sine wave output is difficult because the two phases only are on-off controlled. Further, because the control circuit is composed of discrete circuit parts, there is yet considerable room for improvement from the viewpoint of simplification of the circuit scale.

On the other hand, although the methods disclosed in JP-A-62-163577 and U.S. Pat. Application Ser. No. 2283 cited above are satisfactory in that the PWM signal has a pulse pattern close to the waveform of a sine wave, and that the structure of the control circuit is simplified, the applicable subject of those methods is limited to the current source inverter, and the methods cannot be directly applied to the voltage source inverter.

SUMMARY OF THE INVENTION

It is an object of the present invention to provide an apparatus and method capable of substantially completely controlling a PWM-controlled voltage source inverter according to a software program while satisfying the requirements that the inverter generates a PWM output pattern sufficiently close to a sine wave and the number of discrete circuit parts used in the control circuit can be greatly decreased.

The control apparatus of the present invention which attains the above object produces a control signal (an on/off signal) for controlling switching elements constituting the inverter according to a control sequence as described below. That is, when a control command value of an inverter output is determined, a control mode corresponding to the control command value is selected from among a plurality of control modes previously contained in a control table, so that the switching elements to which the control signal is applied and the order of controlling the switching elements are determined. Also, on the basis of the control command value, the difference between a modulation signal and a predetermined reference value is computed for each phase to determine the timing of controlling the switching elements. In this case, the unit control period of each control mode is divided into halves, and the timing of controlling the switching elements is determined in the individual halves of the with control period. Then, the selected control mode is combined with the determined timing of controlling the switching elements to produce the control signal.

BRIEF DESCRIPTION OF THE DRAWINGS

FIGS. 5, 6, 7, 8, 9 and 10 are timing charts for illustrating the operation of the control apparatus shown in FIG. 1.

FIG. 14 shows a table containing various pulse patterns in various modes of controlling the switching elements shown in FIG. 1.

DESCRIPTION OF THE PREFERRED EMBODIMENTS

Inventors including some of the inventors of the present application made a proposal in which the apparatus used for controlling the PWM-controlled current source inverter controlled in JP-A-62-163577 cited already was applied to an apparatus for controlling a PWM-controlled voltage source inverter. A patent application disclosing the above proposal was filed as Japanese Patent Application No. 62-171026 on July 10, 1987, but has not been laid open up to now. Also, corresponding patent applications have not yet been filed in foreign countries. This earlier application filed in Japan proposes a method comprising the steps of detecting the difference between the peak value of a modulation wave signal of each phase and a predetermined reference value in response to the application of a phase control command, determining the above value for each phase in a unit control period (the value corresponding to the reciprocal of the switching frequency), and repeating the above steps to produce a pulse pattern used for controlling the switching elements of the voltage source inverter. In the proposed method, a software program is used to execute the control of the voltage source inverter. However, because the on/off frequency of the output voltage of the inverter cannot be made higher than the on/off frequency (the switching frequency) of the switching elements, it is difficult to effectively decrease the noise generated from a motor coupled to the inverter.

In the control apparatus embodying the present invention, the noise generated from the motor can be effectively decreased by controlling ON/OFF operation of the inverter output voltage in higher frequency than the switching frequency of the switching elements forming the inverter. Further details of such embodiment will be explained below.

Figure 1:
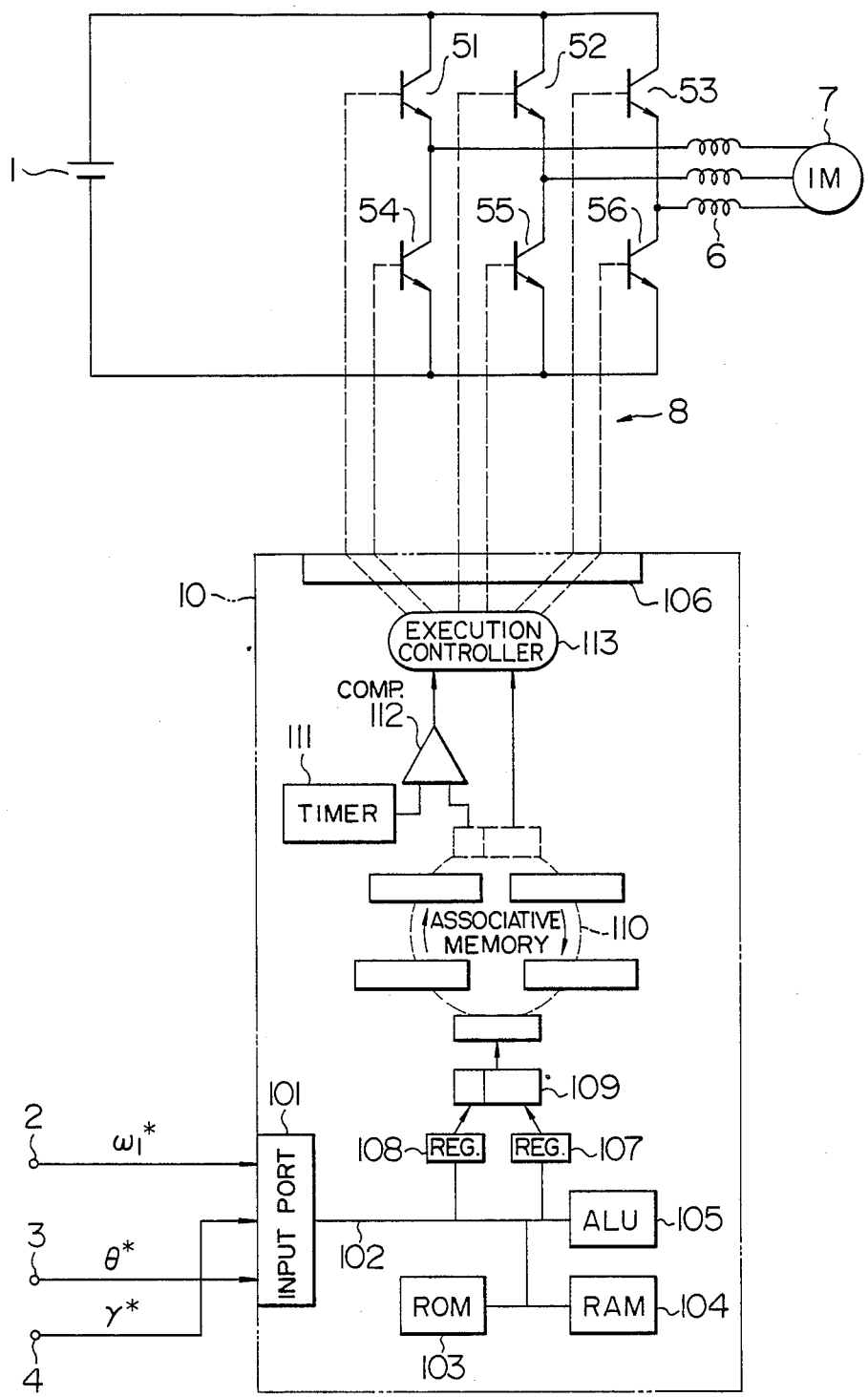
FIG. 1 is a block diagram showing the structure of a preferred embodiment of the apparatus for controlling a PWM-controlled voltage source inverter according to the present invention.

FIG. 1 is a block diagram showing the structure of a preferred embodiment of the control apparatus according to the present invention. Referring to FIG. 1, the control apparatus includes a d.c. power source 1, an input terminal 2 for a frequency command signal $\omega_1^*$, an input terminal 3 for a phase command signal $\theta^*$, and an input terminal 4 for a modulation factor command signal $\gamma^*$. A main switching circuit 5 of a voltage source inverter includes a plurality of or six transistors 51 to 56 acting as semiconductor switching elements. (In FIG. 1, reverse conducting diodes are not shown). The voltage source inverter is connected through a noise-preventive a.c. reactor 6 to an induction motor 7 which is a load of the inverter. The control apparatus further includes a control-purpose one-chip microcomputer 10 connected to the transistors 51 to 56 of the inverter by PWM control pulse signal lines 8.

The microcomputer 10 includes an input port 101 connected to the input terminals 2, 3 and 4 for receiving the control command signals described above, an internal bus 102, a ROM 103 storing various control programs, a pulse width data table, etc., a RAM 104 used as a temporary storage and a register, a microprocessor (ALU) executing arithmetic and logical operations, a mode setting register 107 setting or selecting a control mode (information concerning the transistors to be controlled and the order of controlling the transistors) required for supplying a predetermined pulse pattern to an output port 106, a timing setting register 108 setting the timing of enabling the selected control mode, a hold register 109 holding the combination of the data of the selected control mode and the data of the control-mode enabling timing registered in the respective registers 107 and 108, an associative memory 110 including a plurality of memory units for sequentially storing the data transferred from the hold register 109 each time the data of the control mode and the data of the control mode enabling timing are set, a timer 111 continuously generating an output representing the real time, a comparator 112 comparing the control timing data stored in the associative memory 110 with the real time output of the timer 111 and generating a coincidence signal when coincidence is reached therebetween, and an execution controller 113 operating in response to the application of the coincidence signal from the comparator 112 to read out the combination of the control mode data and the coinciding control timing data from the associative memory 110 when the control timing data stored in one of the memory units of the associative memory 110 does not coincide with the real time data supplied from the timer 111, the comparator 112 compares the control timing data stored in the next memory unit of the associative memory 110 with the real time data supplied from the timer 111. Therefore, only when the desired control timing coincides with the real time, the execution controller 113 can decide the control signal to be applied to control the transistors specified by the control mode data. In response to the application of the coincidence signal from the comparator 112, the execution controller 113 receives and checks the control mode data supplied from the associative memory 110 and decides the rise time and fall times of pulses of the control signal. Then, the execution controller 113 decides a pin of the output port 106 to which the control signal is to be applied among a total of six pins and sends out the control signal to the main switching circuit 5 through the selected pin of the output port 106.

Figure 2:
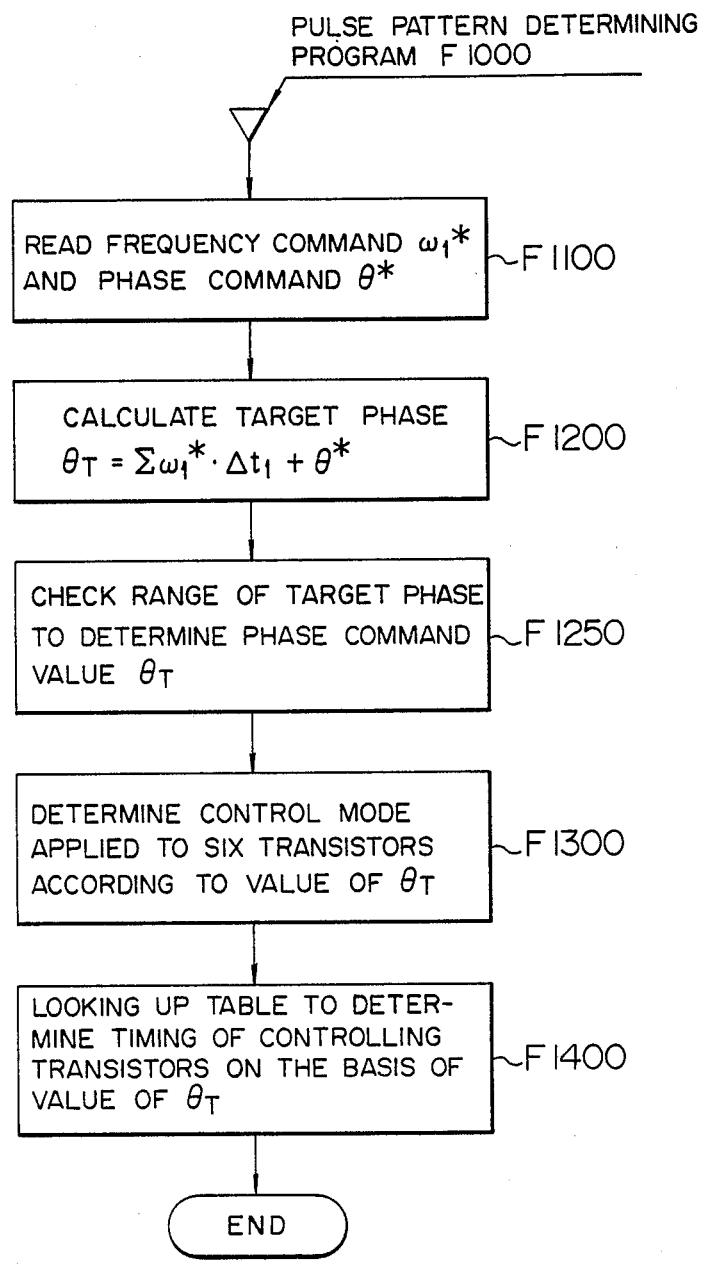
FIGS. 2, 3 and 4 are flow charts for illustrating the operation of the control apparatus shown in FIG. 1.
Figure 3:
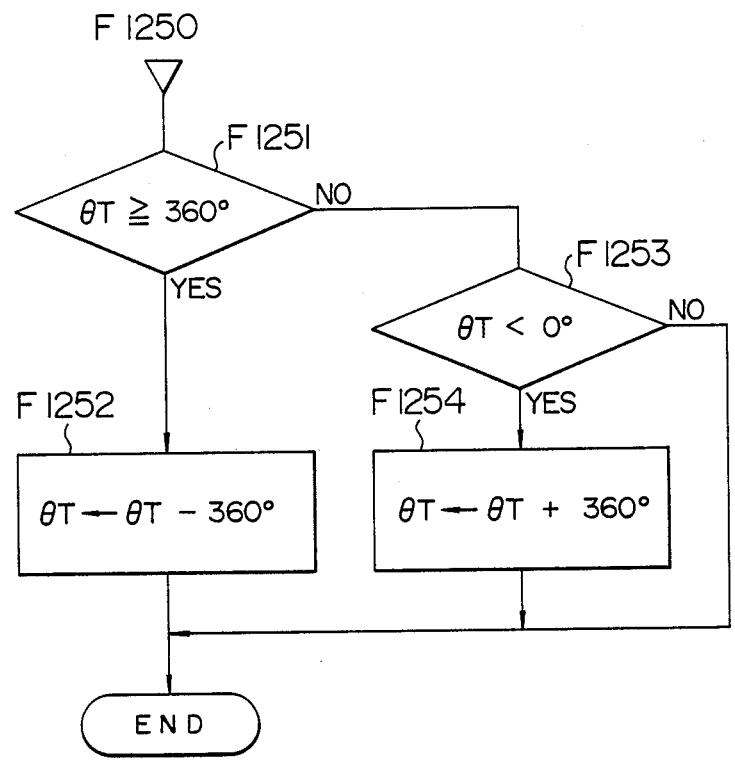

FIG. 2 is an outline of a flow chart of a pulse pattern determining program executed for determining the pulse pattern of the control signal applied to the main switching circuit 5 through the output port 106 of the microcomputer 10. In a first step F1100, the frequency command signal $\omega_1^*$ and the phase command signal $\theta^*$ applied to the input port 101 of the microcomputer 10 are read. It is apparent that this reading step F1100 is unnecessary when the values of $\omega_1^*$ and $\theta^*$ are computed in the interior of the microcomputer 10. Then, in a step F1200, the frequency command $\omega_1^*$ is integrated at a time interval of a predetermined period of time $\Delta t_1$, and the phase command $\theta^*$ is added to the result of integration to compute the composite phase $\theta_T$ (control target phase). Then, in a step F1250, whether or not the value of this target phase $\theta_T$ is included within the range of 0° to 360° is checked. When the result of checking proves that the value of the target phase $\theta_T$ i not included within the range of 0° to 360°, the target phase $\theta_T$ is converted into a value which is included within the range of 0° to 360°. FIG. 3 shows details of a flow chart of such processing. First, decision is made in a step F1251 as to whether or not the value of the target phase $\theta_T$ is equal to or larger than 360°. When the results of decision in the step F1251 is "YES", the target phase $\theta_T$ is converted into ($\theta_T$−360°) in a step F1252. On the other hand, when the result of decision in the step F1251 is "NO", decision is further made in a step F1253 as to whether the value of $\theta_T$ is smaller than 0°. When the result of decision in the step F1253 is "YES". $\theta_T$ is converted in a step F1254 into $(\theta_T+360°)$, and the processing comes to an end. On the other hand, when the result of decision in the step F1253 is "NO", conversion of $\theta_T$ is unnecessary, and the processing comes to the end.

In the present invention, six control modes are provided by dividing the electrical angle (the phase) of 360° into six ranges each having an angular range of 60°. In a step F1300 shown in FIG. 2, the most suitable control mode corresponding to the target phase $\theta_T$ computed in the step F1200 is decided. That is, the most suitable pulse pattern of the control signal to be applied to the transistors 51 to 56 is decided. The control modes corresponding to the control phases each having the angular range of 60° are previously determined. For example, the control modes corresponding to the individual control phase ranges are stored in the ROM 103 in the form of a table as shown in FIG. 14.

Figure 4:
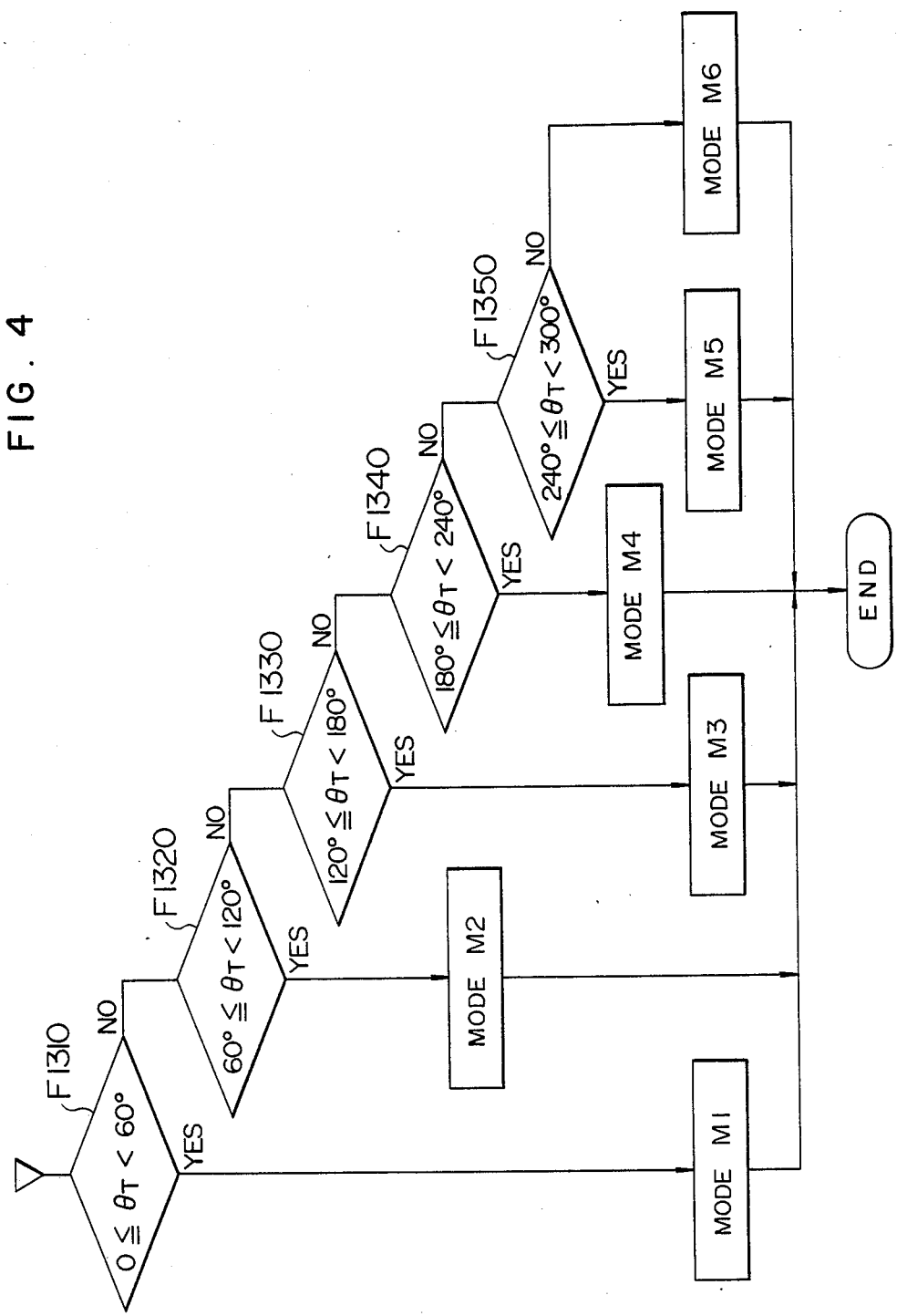
Figure 7:
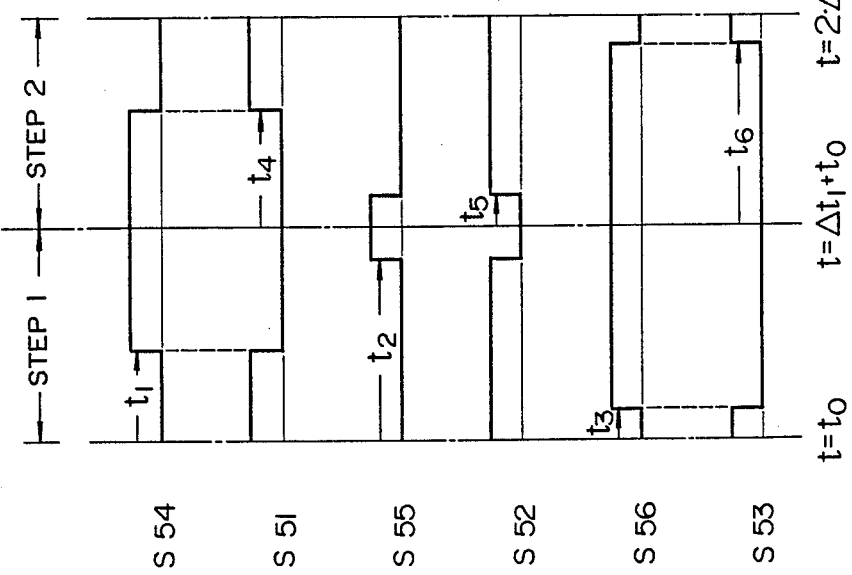
Figure 8:
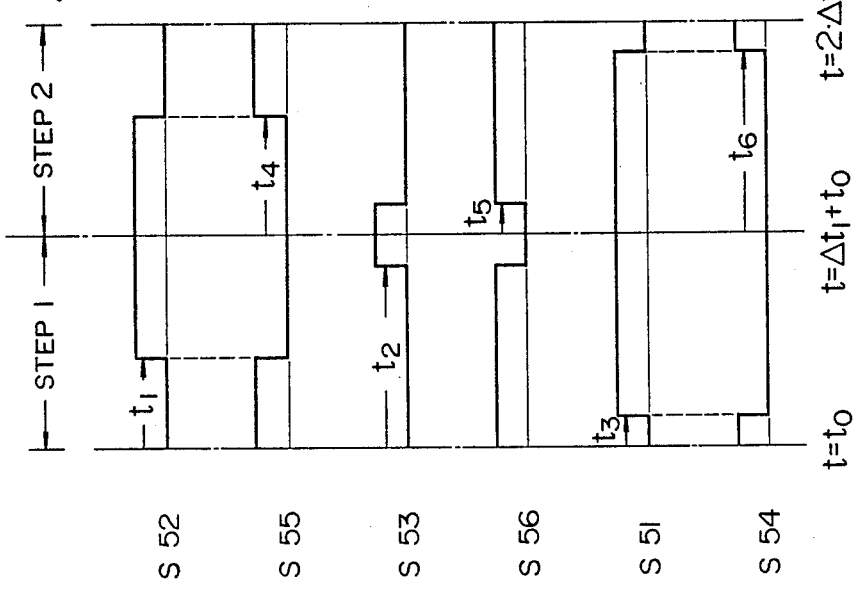
Figure 10:
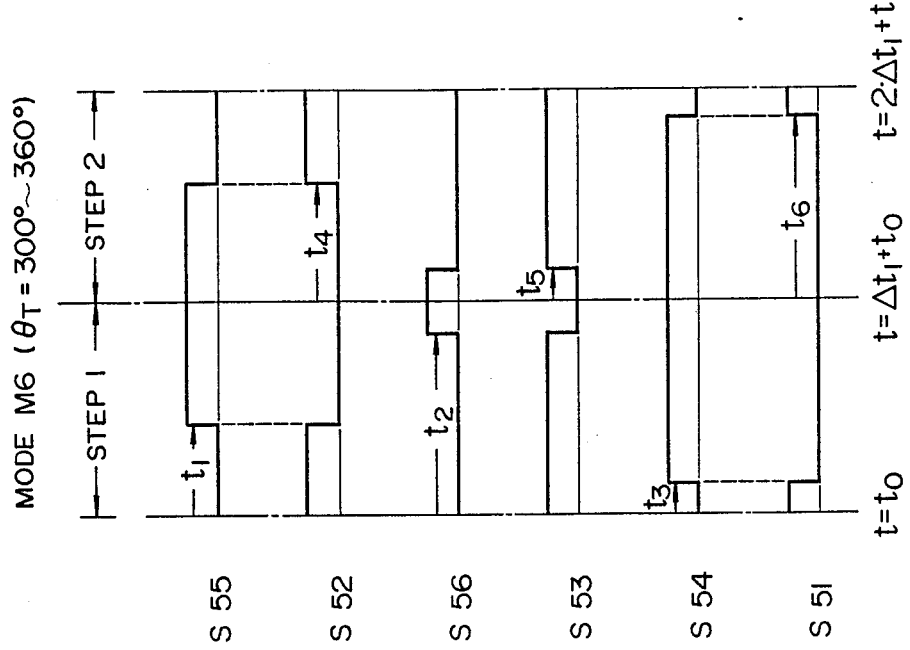
Figure 9:
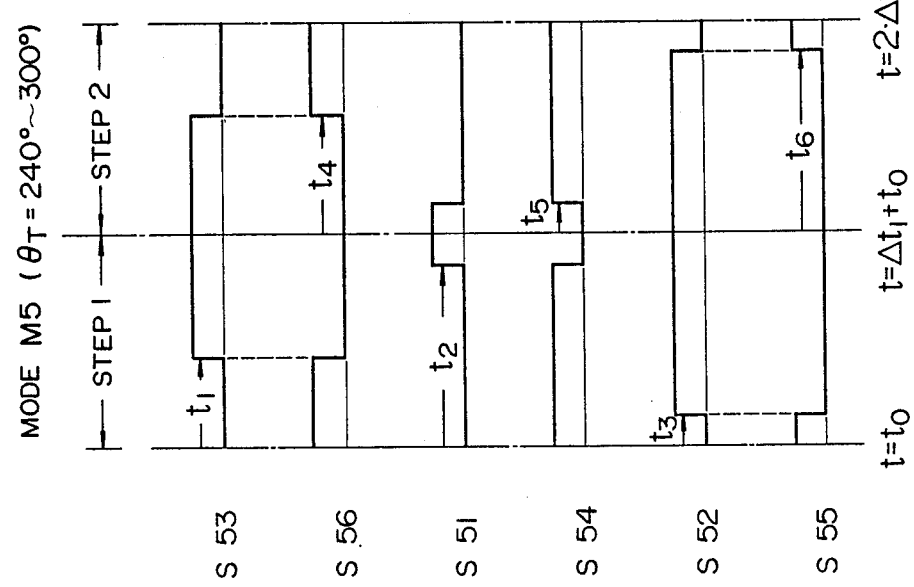

The manner of decision of the pulse pattern in the step F1300 will be described in further detail will reference to FIG. 4.

The manner of inverter control in the illustrated embodiment of the present invention is such that the pulse pattern is changed every electrical angle range of 60°, and one round of the six control modes covering the total electrical angle of 360° is repeated. Thus, one of the six control modes M1 to M6 each covering the range of 60° is selected according to the value of the target phase $\theta_T$ computed in the step F1200. The flow chart of FIG. 4 shows the manner of selection of the most suitable control mode.

Thus, when the most suitable control mode corresponding to the value of the target phase $\theta_T$ is selected, the transistors to be on-off controlled and the order of on-off control are decided.

The practical operation in the individual control modes M1 to M6 will now be described.

In the illustrated embodiment of the present invention, each control mode is divided into a former half and a latter half, that is, a step 1 and a step 2, so that the transistors 51 to 56 are on-off controlled in these steps. By dividing each control mode into the steps 1 and 2 and controlling the transistors 51 to 56 in these steps, the inverter output voltage (the voltage applied to the motor) can be controlled at a frequency two times as high as the on/off frequency (the switching frequency) of the transistors.

FIG. 5 shows the operation in the control mode M1, that is, the operation when the value of the target phase $\theta_T$ is included within the electrical angle range of 0° to 60°. FIG. 5 shows that the levels of the pulses applied to the transistors 51, 52 and 53 change after respective periods of time (control timing) $t_1$, $t_2$ and $t_3$ from time $t=t_0$ in the step 1, and those of the pulses applied to the transistors 54, 55 and 56 change after respective periods of time (control timing) $t_4$, $t_5$ and $t_6$ from time $t=\Delta t_1+t_0$ in the step 2. The manner of computation of these periods of times $t_1$, $t_2$, $t_3$, $t_4$, $t_5$ and $t_6$ will be described later. Suppose now that these periods of time $t_1$ to $t_6$ are previously determined as shown. In such a case, the transistors 54, 55 and 56 disposed on the negative arm are initially in their on state at time $t=t_0$ in the step 1 of the control mode M1. All of the remaining transistors 51, 52 and 53 disposed on the positive arm are initially in their off state at time $t=t_0$. After the period of time $t_3$, the transistor 56 on the negative arm is turned off, and the transistor 53 on the positive arm is turned on. Similarly, after the period of time $t_1$, the transistor 54 on the negative arm is turned off, and the transistor 51 on the positive arm is turned on. Also, after the period of time $t_2$, the transistor 55 on the negative arm is turned off, and the transistor 52 on the positive arm is turned on. In this manner, the transistors 51 to 56 are turned on and off in the order described above.

Then, the transistors 51 and 54 are turned off and on respectively after the period of time $t_4$ from time $t=\Delta t_1+t_0$, the transistors 52 and 55 are turned off and on respectively after the period of time $t_5$, and the transistors 53 and 56 are turned off and on respectively after the period of time $t_6$. The pulse pattern in the control mode M1 is determined in the manner described above so that the transistors 51 to 56 are selectively turned on and off. However, the values of the periods of time $t_1$, $t_2$ and $t_3$ change depending on the value of the target phase $\theta_T$. In FIG. 5, the value of the target phase $\theta_T$ is supposed to be very close to 0°, and the transistors 53, 54 and 55 are turned off in the illustrated order. However, the order of turning off these transistors may change, because as will be seen in FIG. 11A, the positive level of the modulation wave signal of one phase is reversed from that of the modulation wave signal of another phase at the boundary where the electrical angle is 30°.

Pulse patterns corresponding to the control modes M2 to M6 are determined as shown in FIGS. 6 to 10 respectively. These control modes M2 to M6 are generally similar to the control mode M1 except that the order of turning on and off the transistors 51 to 56 is different from that shown in FIG. 5, and description of the details of these control modes will be unnecessary.

Referring to FIG. 2 again, the periods of time $t_1$ to $t_3$ and $t_4$ to $t_6$ scheduled for changing the pulse pattern at the interrupt time interval of $\Delta t_1$ on the basis of the value of the target phase $\theta_T$ are detected in a step F1400, by reference to the table stored in the ROM 103.

The manner of processing in this step F1400 will be described with reference to FIGS. 11A and 11B.

The modulation wave signal corresponding to each of the 120° different three phases of the a.c. output of the inverter is expressed as $\sin \theta$, $\sin (\theta-\frac{2}{3}\pi)$ and $\sin (\theta=4/3 \pi)$. In the illustrated embodiment of the present invention, two kinds of predetermined reference values are previously set. That is, a first reference value X having a level higher than the level of the positive peak value of the modulation signal of each phase and a second reference value having a level lower than the level of the negative peak value of the modulation wave signal of each plane are previously set, and the periods of time $t_1$ to $t_3$ and $t_4$ to $t_6$ are computed on the basis of these reference values. The first reference value X, the second reference value Y and the data of the modulation wave signal of each phase are stored in the ROM 103, and the ALU 105 executes the computation of the control timings $t_1$ to $t_6$.

Figure 11A:
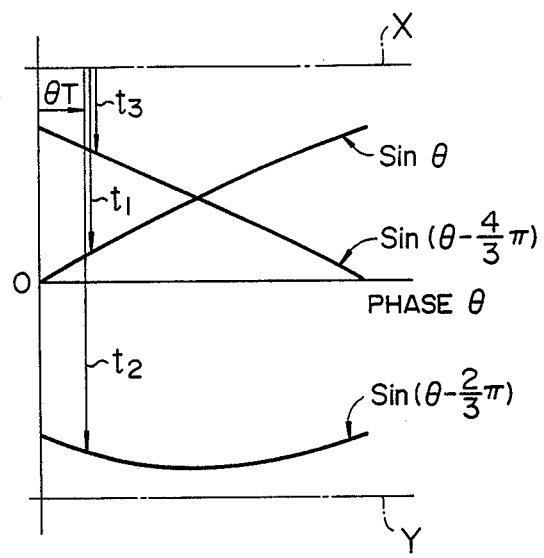
FIGS. 11A and 11B show how PWM pulses are produced.

First, when the target phase $\theta_T$ is given as shown in FIG. 11A, the differences between the first reference value X and the instantaneous value of the modulation wave signal of each phase at the given target phase $\theta_T$ are computed to detect the respective periods of time $t_1$, $t_2$ and $t_3$.

Figure 11B:
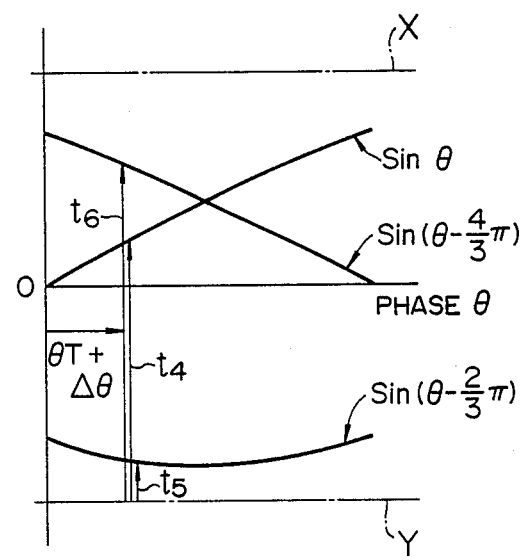

Then, when the next target phase $\theta_T+\Delta\theta$ is given as shown in FIG. 11B, the difference between the second reference value Y and the instantaneous value of the modulation wave signal of each phase at the given target phase $\theta_T+\Delta\theta$ are computed to detect the respective periods of time $t_4$, $t_5$ and $t_6$.

Thus, the control timing $t_1$ to $t_6$ in the control modes shown in FIGS. 5 to 10 are given so that the pulse pattern in each step of each control mode can be determined.

When adjustment of the modulation factor $\gamma^*$ is additionally required, further processing may be made in which the computed periods of time $t_1$ to $t_6$ are multiplied by the adjusted modulation factor $\gamma^*$.

The target phase $\theta_T+\Delta\theta$ shown in FIG. 11B means the phase detected at the time (the second instant) where the predetermined constant period of time $\Delta t_1$ has elapsed from the time (the first instant) where the target phase $\theta_T$ shown in FIG. 11A was given. The value $\Delta\theta$ in the target phase $\theta_T+\Delta\theta$ includes an integrated component of the frequency command $\omega_1^*$ and a changed component of the phase command $\theta^*$. Also, the predetermined constant period of time $\Delta t_1$ described above means the time interval of computing the pulse width. The value of $\Delta\theta$ can be approximated as $\Delta\theta=0$ when the time interval $\Delta t_1$ is very short. Therefore, in the case of computation of the differences between the second reference value Y and the instantaneous values of the modulation wave signal of each phase, the value of the composite phase $\theta_T$ used when computing the differences between the first reference value X and the instantaneous values of the modulation wave signal of each phase can be directly used without giving rise to any substantial problem. In such a case, the pulse pattern in each of the control modes shown in FIGS. 5 to 10 is symmetrical on both sides of $t=\Delta t_1$ to $t_0$.

The manner of computation of the periods of time $t_1$ to $t_6$ in the control mode M1, in which the composite phase $\theta_T$ is included within the range of 0° to 60° and which is shown in FIG. 5 has been described with reference to FIGS. 11A and 11B. The same applies to the remaining control modes M2 to M6, and any detailed description will be unnecessary.

The processing described above determines the two items, that is, the data of the control mode and the data of the control timing to be registered in the two registers 107 and 108 respectively.

Figure 12:
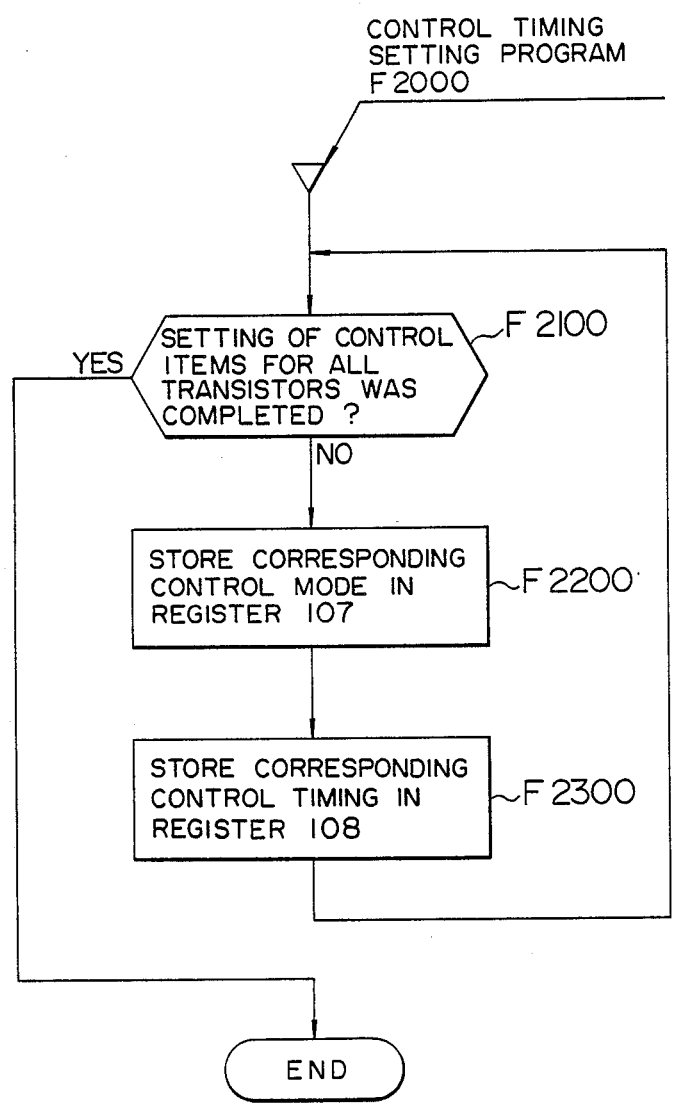
FIGS. 12 and 13 are flow charts for illustrating the operation of the control apparatus shown in FIG. 1.

FIG. 12 is a flow chart of a program F2000 for storing the data of the two items described above in the associative memory 110 provided for controlling the output port 106 of the microcomputer 10.

First, decision is made in a step 2100 as to whether or not all the control modes and control timings required for controlling the six transistors 51 to 56 have been completely stored in the associative memory 110. When the result of decision in the step F2100 is "NO", the corresponding control mode is stored in the register 107 in a step F2200, and the corresponding control timing is stored in the register 108. The steps F2100, F2200 and F2300 are repeated until the result of decision in the step F2100 becomes "YES", and the program F2000 comes to its end.

Figure 13:
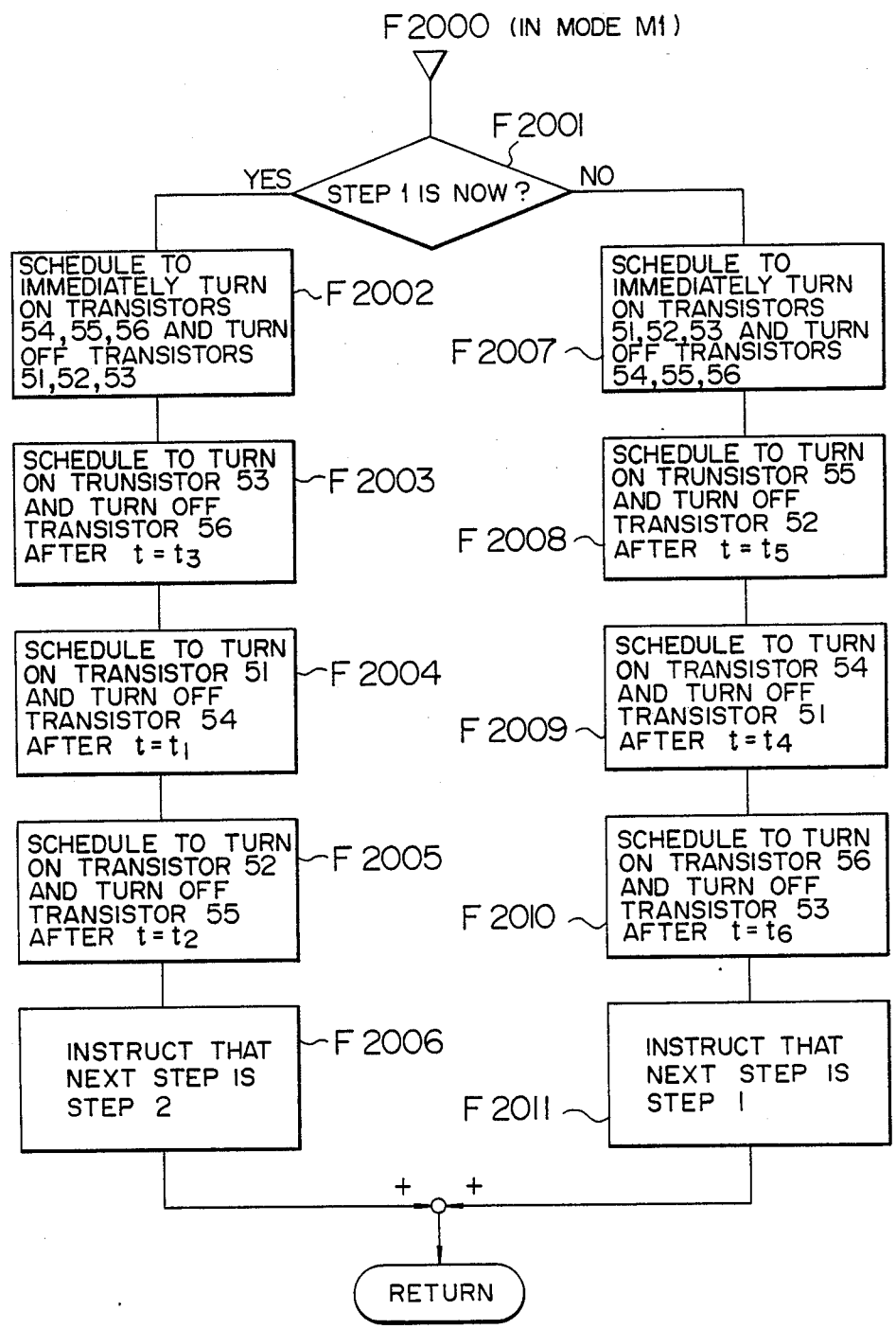

In FIG. 12, a loop flow is shown for illustrating the outline of the program F2000. Actually, however, the program F2000 includes series flows as shown in FIG. 13. Therefore, the program F2000 for setting and executing a control mode will be described in further detail with reference to FIG. 13.

The flow chart of FIG. 13 corresponds to the control mode M1 shown in FIG. 5 in which the value of the composite phase $\theta_T$ is included within the range of 0° to 60°. As described already, the control mode M1 shown in FIG. 5 includes the control step 1 ranging from time $t=t_0$ to time $t=\Delta t_1+t_0$, and the control step 2 ranging from time $t=\Delta t_1+t_0$ to time $t=2\cdot\Delta t_1+t_0$.

First, decision is made in a step F2001 shown in FIG. 13 as to whether the present processing is to be directed to the control step 1 or step 2. According to the result of decision in the step F2001 and instructions given in later steps F2006 and F2011, the control step 1 and control step 2 are basically alternately repeated. Suppose now, for example, that the result of decision in the step F2001 is "YES". In this case, a step F2002 is executed. This step F2002 is scheduled to provide the pulse pattern for immediately turning on the transistors 54, 55, 56 and immediately turning off the transistors 51, 52, 53. Then, a step F2003 is executed which is scheduled to turn on the transistor 53 and turn off the transistor 56 after the period of time $t_3$. Then, a step 2004 is executed which is scheduled to turn on the transistor 51 and turn off the transistor 54 after the period of time $t_1$. Then, a step F2005 is executed which is scheduled to turn on the transistor 52 and turn off the transistor 55 after the period of time $t_2$. Then, in a step F2006, an instruction instructing execution of schedules of the control step 2 in the next processing which starts at time $t=\Delta t_1+t_0$.

On the other hand, the step F2001 is "NO", a step F2007 is executed which is scheduled to immediately turn on the transistors 51, 52, 53 and immediately turn off the transistors 54, 55, 56. Then, a step F2008 is executed which is scheduled to turn on the transistor 55 and turn off the transistor 52 after the period of time $t_5$. Then, a step F2009 is executed which is scheduled to turn on the transistor 54 and turn off the transistor 51 after the period of time $t_4$. Then, a step F2010 is executed which is scheduled to turn on the transistor 56 and turn off the transistor 53 after the period of time $t_6$. Finally, in a step F2011, an instruction instructing execution of the schedules of the control step 1 in the next processing is given, and the program F2000 comes to its end.

The operation in the case of the control mode M1 has been described with reference to FIG. 13, by way of example. It is apparent that, in the other control modes, the corresponding transistors turned on and off in the steps F2002 to F2005 and F2007 to F2010 change as shown in the table of FIG. 14. Therefore, six kinds of processing programs similar to that described with reference to FIG. 13 are cyclically executed while changing over the transistors in each control mode as seen in FIG. 14. The table shown in FIG. 14 is stored in the ROM 103 of the microcomputer 10.

Figure 15:
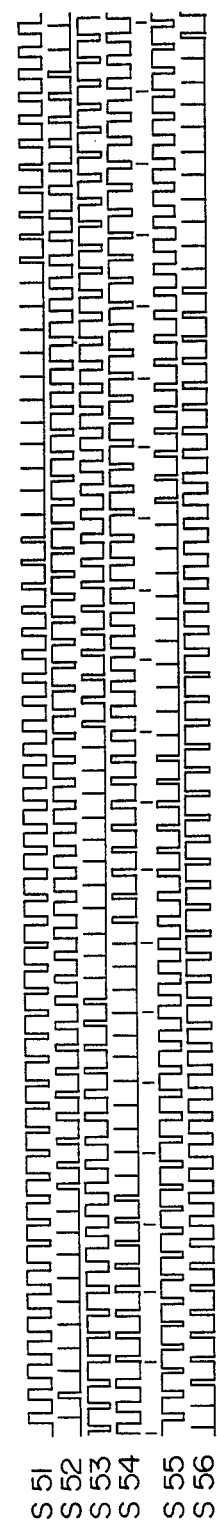
FIG. 15 shows an example of waveforms of the PWM pulses.

FIG. 15 shows an example of the PWM control pulse pattern obtained by the above manner of control according to the present invention. It will be apparent from FIG. 15 that the pulse pattern includes changing pulse widths providing a waveform sufficiently close to a sinusoidal waveform.

In the embodiment of the present invention described above, the processing program comprises the steps of computing the composite phase $\theta_T$, determining the transistors to be turned on/off on the basis of the computed composite phase $\theta_T$, determining the on/off timing of the transistors on the basis of the phase $\theta_T$ too, and finally scheduling the combination of the transistors to be turned on/off and the timing of controlling those transistors. The processing program described above is sequentially repeated at the time interval of the predetermined constant period of time $\Delta t_1$. Therefore such a manner of sequential processing is advantageous over the prior art method of comparing modulation wave with carrier wave in that not only the microprocessor is freed from being always restrained for the signal comparison purpose, but also the inverter can generate an output waveform close to a sinusoidal waveform because of the effect of the pulse pattern control.

In the aforementioned embodiment of the present invention, the frequency command $\omega_1^*$ and the phase command $\theta^*$ are used to compute the composite phase $\theta_T$ taking into consideration the vector control of the induction motor. However, in the case where application of the inverter frequency command $\omega_1^*$ only is required, and the phase command $\theta^*$ need not be applied, the composite phase $\theta_T$ can be computed according to the equation $$\theta_T = \Sigma \omega_1^* \Delta t$$

without impairing the essence of the present invention.

Further, the programmable I/O function in the one-chip microcomputer 10 shown in FIG. 1 is utilized for the execution of scheduled processing in the control mode setting and execution program F2000 shown in FIG. 13. However, when the capacity of the input and output ports 101 and 106 is insufficient or when the programmable I/O function in the one-chip microcomputer 10 cannot be used due to the necessity of, for example, checking the port output signals, an external peripheral I/O equipment having an equivalent function may be used to exhibit the effect similar to that described above.

The foregoing description has not referred in detail to a change in the timer interrupt time interval $\Delta t_1$. However, in the case of an application where the switching frequency must be changed due to an external factor such as a temperature rise of the switching elements, any change in the time interval $\Delta t_1$ can be dealt with by merely adding a routine in which the pulse width is changed in proportion to such changes in the external factors.

In the aforementioned embodiment of the present invention, the a.c. output of the inverter is supposed to have a sinusoidal waveform, and, on the basis of the above supposition, the modulation wave signal having a purely sinusoidal waveform is used. However, when the main switching elements (the transistors in the case of the illustrated embodiment) used in the inverter require a relatively long dead time for preventing an undesirable short-circuit trouble, use of the modulation wave signal having the purely sinusoidal waveform would not always bring the best result.

In such a case, a modified sine wave signal modified by adding, for example, a positive bias and a negative bias to the sine wave signal to an interval of an electrical angle of 180°, or a modified sine wave signal obtained by adding and subtracting bias components to and from the sine wave signal after retrieval of the sine wave signal may be used as the modulation wave signal, so that the resultant a.c. output of the inverter has a sinusoidal waveform.

It will be understood from the foregoing detailed description of the present invention that a PWM-controlled voltage source inverter can be controlled according to a software program in a manner entirely different from the prior art method of comparing modulation wave with carrier wave. Therefore, the control circuit can be made smaller in scale, while, at the same time, the high reliability and accuracy of the operation of the control circuit can be further improved.

We claim:

1. A control apparatus generating a control signal for controlling the conduction state of a plurality of switching elements in a PWM-controlled voltage source inverter converting a d.c. power input into a polyphase a.c. power output, comprising:

(a) means responsive to given target command values which are parameters relating to the a.c. output of said inverter for determining a composite phase command value $\theta_T$;

(b) control mode selecting means responsive to said composite phase command value $\theta_T$ for selecting a control mode specifying the order of controlling said plural switching elements from among a plurality of control modes;

(c) means for determining control timing for said switching elements to be controlled in order specified by said control mode selected in response to said composite phase command value, said control timing determining means including means for generating a modulation wave signal corresponding to each phase of said polyphase a.c. power, means for setting a first reference value having a level higher by a predetermined value than the level of the positive peak value of said modulation wave signal of each phase and a second reference value having a level lower by a predetermined value than the level of the negative peak value of said modulation wave signal of each phase, means for setting the difference between said first reference value and the instantaneous value of said modulation wave signal of each phase at said composite phase command value as a first control timing for said switching elements, and means for setting the difference between said second reference value and the instantaneous value of said modulation wave signal of each phase at a value, which is the sum of said composite phase command value and a predetermined phase value $\Delta \theta$, as a second control timing succeeding said first control timing for said switching elements; and (d) means for generating a control signal to control said switching elements on the basis of said selected control mode and said first and second control timing settings, said control signal generating means further including timer means generating an output representing the real time, comparing means generating a coincidence signal when coincidence is detected between the real time output of said timer means and said first or second control timing setting, sand output means responsive to said coincidence signal for applying said control signal at said control timings to said switching elements to be controlled in the order specified by said selected control mode at a constant time interval $\Delta t_1$.

2. A method for generating a control signal for controlling the conducting state of a plurality of switching elements in a PWM-controlled voltage source inverter converting a d.c. power input into a polyphase a.c. power output, comprising the steps of:

(a) determining a composite phase command value $\theta_T$ corresponding to given target command values which are parameters relating to the a.c. output of said inverter;

(b) selecting, in response to said composite phase command value θT, a control mode specifying the order of controlling said plural switching elements from among a plurality of control modes;

(c) determining control timing for said switching elements to be controlled in the order specified by said composite phase command value, said control timing determining step including generating a modulation wave signal corresponding to each phase of said polyphase a.c. power, setting a first reference value having a level of the positive peak value of said modulation wave signal of each phase and a second reference value having a level lower by a predetermine value than the level of the negative peak value of said modulation wave signal of each phase, setting the difference between said first reference value and the instantaneous value of said modulation signal of each phase at said composite phase command value as a first control timing for said switching elements, and setting the difference between said second reference value and the instantaneous value of said modulation wave signal at a value, which is the sum of said composite phase command value and a predetermined phase value $\Delta\theta$, as a second control timing succeeding said first control timing for said switching elements; and (d) generating a control signal to control said switching elements on the basis of said selected control mode and said first and second control timing settings, said control signal generating step further including generating a coincidence signal when coincidence is detected between the real time and said first or second control timing settings, and, in response to said coincidence signal, applying said control signal at said control timings to said switching elements to be controlled in the order specified by said selected control mode at a constant time interval $\Delta t_1$.

3. A method according to claim 2, wherein said first control timing and said second control timing are alternately set and read out at the constant time interval $\Delta t_1$.

4. A method according to claim 2, wherein said predetermined phase value $\Delta\theta$ is determined by the following equation:

$$\int \omega^*1(n+1)dt + \theta^*(n+1) - \theta^*(n)$$

where n is an integer, $\omega^*1(n+1)$ represents a target frequency command signal, $\theta^*(n+1)$ represents a present target phase command signal and $\theta^*(n)$ represents a former target phase command signal.

5. A method according to claim 4, wherein, in said step of selecting said control mode, a different one of said composite plural control modes is selected whenever said phase command value is changed by an electrical angle of 60°.

6. A method according to claim 4, wherein said said predetermined phase value $\Delta\theta$ is given by the sum of a value obtained by integrating said target frequency command value of the inverter output at a time interval of a unit time and said target phase command value of the inverter output.

7. A method according to claim 4, wherein the absolute value of said first reference value and that of said second reference value are selected to be equal to each other.

8. A method according to claim 7, wherein the absolute values of said first and second reference values are selected to be equal to a half period of time corresponding to said predetermined phase value.

9. A method according to claim 4, wherein said step of selecting said control mode includes the step of making reference to a previously prepared table showing a correspondence between said switching elements to be turned on/off at said first and second control timings and said plural control modes specifying the order of controlling said switching elements.

10. A method according to claim 4, wherein said predetermined phase value $\Delta\theta$ used for setting said second control timing is selected to be zero.

11. A method according to claim 10, wherein said second control timing setting is obtained by subtracting said first control timing setting from a predetermined period of time.

12. A method according to claim 11, wherein said composite phase command value is determined at a time interval of a period of time which is twice as long as said predetermined period of time.

13. A method according to claim 12, wherein said composite phase command value is given by integrating said target frequency value of the inverter output at a time interval of said predetermined period of time.

14. A method according to claim 13, wherein said predetermined period of time is variable.

15. A method according to claim 4, wherein the absolute values of said first and second reference values are selected to be different from each other.

16. A method according to claim 2, wherein said predetermined phase value $\Delta\theta$ is determined by the following equation:

$$\omega^*1(n+1) + \theta(n+1) - \theta^*(n)$$

where n is an integer, $\omega^*1(n+1)$ represents a target frequency command signal, $\theta^*(n+1)$ represents a present target phase command signal and $\theta^*(n)$ represents a former target phase command signal.

* * * * *